US008087078B2

(12) United States Patent
Kamiya et al.

(10) Patent No.: US 8,087,078 B2
(45) Date of Patent: *Dec. 27, 2011

(54) COMMUNICATION DEVICE

(75) Inventors: Dai Kamiya, Tokyo (JP); Kazuhiro Yamada, Yokohama (JP); Yutaka Sumi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 445 days.

This patent is subject to a terminal disclaimer.

(21) Appl. No.: 12/392,705

(22) Filed: Feb. 25, 2009

(65) Prior Publication Data

US 2009/0193515 A1    Jul. 30, 2009

Related U.S. Application Data

(63) Continuation of application No. 10/514,685, filed as application No. PCT/JP03/06099 on May 16, 2003, now Pat. No. 7,818,815.

(30) Foreign Application Priority Data

May 17, 2002  (JP) ................................. 2002-143608

(51) Int. Cl.
  *G06F 12/14* (2006.01)
(52) U.S. Cl. .......................................... 726/17; 726/30
(58) Field of Classification Search .................... 726/17, 726/30

See application file for complete search history.

(56) References Cited

U.S. PATENT DOCUMENTS

| | | | |
|---|---|---|---|
| 5,675,782 A * | 10/1997 | Montague et al. | 726/4 |
| 5,790,423 A | 8/1998 | Lau et al. | 364/514 R |
| 5,848,232 A | 12/1998 | Lermuzeaux et al. | |
| 6,088,708 A | 7/2000 | Burch et al. | |
| 6,173,404 B1 | 1/2001 | Colburn et al. | 713/200 |
| 6,199,046 B1 | 3/2001 | Heinzle et al. | |
| 6,219,787 B1 | 4/2001 | Brewer | |
| 6,704,873 B1 | 3/2004 | Underwood | |
| 6,871,277 B1 | 3/2005 | Keronen | |
| 7,093,298 B2 | 8/2006 | Rodriquez et al. | |

(Continued)

FOREIGN PATENT DOCUMENTS

CN     1292897     4/2001

(Continued)

OTHER PUBLICATIONS

Kaku, T. et al., "Hajimete no i-mode Java Programming (Introduction to Java Programming in i-mode)", *Nikkei Business Publications, Inc.* Mar. 26, 2001, pp. 30-41.

(Continued)

*Primary Examiner* — Michael S McNally

(74) *Attorney, Agent, or Firm* — Brinks Hofer Gilson & Lione

(57) ABSTRACT

With regard to data, stored in mobile phone 40, whose a security level is high and contents whose copyrights are protected, mobile phone 40 encapsulates data and contents, and includes the encapsulated data or the encapsulated contents. Further, mobile phone 40 processes the encapsulated data as a perfect encapsulated object utilizing only a method which is not authorized access to the encapsulated data by an executed program (E.g. Downloaded Java Applications). Java AP downloaded to mobile phone 40 instructs a perfect encapsulated object to process the encapsulated data in the perfect encapsulated object by using a method belonging to the perfect encapsulated object. Therefore, this invention makes it possible to ensure securities for programs to be provided through the network without losing diversifications of programs.

15 Claims, 10 Drawing Sheets

U.S. PATENT DOCUMENTS

| | | | |
|---|---|---|---|
| 7,644,444 B2 | 1/2010 | Kamiya et al. | 726/29 |
| 7,818,815 B2 | 10/2010 | Kamiya | 726/30 |
| 2001/0029581 A1 | 10/2001 | Knauft | |
| 2002/0103942 A1* | 8/2002 | Comeau | 709/321 |
| 2002/0120859 A1 | 8/2002 | Lipkin et al. | |
| 2004/0142682 A1 | 7/2004 | Kamiya et al. | |
| 2005/0235291 A1 | 10/2005 | Kamiya et al. | 719/315 |

FOREIGN PATENT DOCUMENTS

| | | |
|---|---|---|
| EP | 1 061 440 A2 | 12/2000 |
| JP | 11272616 A | 10/1999 |
| JP | 2001-043176 A | 2/2001 |
| JP | 2001-350664 A | 12/2001 |
| WO | WO 00/28398 | 5/2000 |

OTHER PUBLICATIONS

Oaks, S. "Java Security, 2nd Edition" *O'Reilly Media, Inc.*, May 2001, Chapter 2 and 4.

"i-appli Content Kaihatsu Guide for DoJa-3.0 Shosai-Hen (i-appli Content Developer's Guide for DoJa-3.0 Functional Descriptions)" *NTT DoCoMo, Inc.* Apr. 17, 2003.

Yamato, T., Ketai Yogo no Kiso Chisiki Dai 132 Kai: i-Appli DX towa? (Basic Terminology in Mobile Phone Technology Series 132: What is i-Appli DX?), *Impress Corp.*, May 13, 2003.

Chinese Office Action issued May 12, 2006.

Supplementary European Search Report issued Nov. 5, 2007 in European patent application No. 03723394.7.

IBM Cryptolope Live!, "The Cryptolope Live! Product", XP002908144, General Information Guide, Version 1 Release 1, 1997, pp. 1-36.

Gong, "Java Security Architecture (JDK1.2).", Version 1.0, XP-002171445, pp. 1-62, Dec. 6, 1998.

Kaplan, "IBM Cryptolopes, SuperDistribution and Digital Rights Management", XP-002132994, Dec. 30, 1996.

Oaks, "Java Security, The Default Sandbox", XP-002286453, May 2001 pp. 18-21.

Anonymous: "The Common Object Request Broker: Architecture and Specification" *Internet Article "Online!"* <URL: http://www.omg.org/docs/formal/97-02-25.pdf>, XP002286451, Feb. 25, 1997, 28 Pages.

Magelang Institute: "Introduction to CORBA", *Internet Article "Online!"* <URL: http://java.sun.com/developer/onlineTraining/Downloads/CORBA-JDC.ZIP>, XP002286452, Dec. 3, 1999, pp. 1-24.

Search Report issued Aug. 20, 2004 in European patent application No. 03023298.7.

"Introduction to CORBA", http://java.sun.com/developer/onlineTraining/cobra.html, Dec. 3, 1999, pp. 1-22.

Notice of Allowance mailed May 5, 2010, in U.S. Appl. No. 10/514,685 (12 pages).

Decision to Refuse a European Patent Application issued Jul. 15, 2010, in European Patent Application No. 03 723 394.7, 40 pages.

Minutes of Oral Proceedings issued Jul. 15, 2010, in European Patent Application No. 03 723 394.7, 13 pages.

Notice of Allowance mailed Sep. 18, 2009, in U.S. Appl. No. 10/684,968 (9 pages).

Office Action dated Oct. 20, 2009, issued in U.S. Appl. No. 10/514,685, (26 pages).

Deitel et al., "Java—How to Program," 1999, Prentice Hall, Third Edition, p. 366-371 and 774-816.

* cited by examiner

FIG. 3

| DATA NAME | TYPE DESIGNATION INFORMATION |
|---|---|
| ADDRESS BOOK DATA | 1=(PERFECT ENCAPSULATIONTYPE) |
| E-MAIL DATA | 1 |
| INCOMING AND OUTGOING CALL DATA | 1 |
| USER DATA | 1 |
| CONTENT A (COPYRIGHT PROTECTION FLAG"1") | 1 |
| CONTENT B (COPYRIGHT PROTECTION FLAG"0") | 0=(PERFECT ENCAPSULATIONTYPE) |
| OWN IMAGE DATA | 0 |
| ⋮ | ⋮ |

COMMUNICATION DEVICE

This application is a continuation of U.S. patent application Ser. No. 10/514,685 filed on Jun. 14, 2005 now U.S. Pat. No. 7,818,815, which is a national phase application of PCT Application No. PCT/JP03/06099 filed May 16, 2003, which claims priority to Japanese Patent Application No. 2002-143608. U.S. patent application Ser. No. 10/514,685 is hereby incorporated by reference herein in its entirety.

TECHNICAL FIELD

The present invention relates to technology for ensuring security in a communication device and protecting copyright of the contents.

BACKGROUND ART

A communication device such as a personal computer, or a mobile telephone having a packet communication function, is able to download various types of programs downloaded from a server connected to the Internet.

While an open network such as the Internet enables people worldwide to exchange programs freely, it also has inherent risks, including, for example, data theft from a communication device. Also, a program which causes a malfunction in a communication device may be provided without malicious intent.

Accordingly, a problem might occur if a resource inside or outside a communication device is accessed easily by a program, provided through a network, without any restrictions. For example, a user's telephone number, mail address or bank account number, each of which is stored in a communication device, may be freely read out from the communication device. In view of these risks, user's privacy is a major concern.

It is possible to restrict the functions of programs provided to communication devices. For example, a mobile phone which is able to execute programs written in Java® imposes restrictions on such programs. Specifically, programs are only authorized to access the restricted resources, and programs are not authorized to access resources such as address book data or user's personal information.

DISCLOSURE OF INVENTION

The mechanism of restricting access to resources, as described above, provides some security for users of communication devices. However, it causes various restrictions in the operation of programs downloaded through the network. That is to say, it restricts program diversification such as function modifications or additions in communication devices.

However, in the operation of programs downloaded through the network, if such downloaded programs are freely able to access resources without any restrictions, a malfunction may be caused by downloaded programs provided by a malicious user, or by downloaded programs which cause a malfunction in a communication device. Then, it is possible to cause a malfunction not only to a communication device which executed downloaded programs, but also to communication devices which communicated with the communication device which executed downloaded programs.

The present invention has been made with a view to overcoming the above-mentioned problems, and has as its object the provision of a communication device, program and recording media or providing a diversity of programs while ensuring security for programs.

To solve the above problems, the present invention provides a communication device comprising a receiving means for receiving a program; a specifying means for specifying data to be used from among data stored in the communication device when a program received by the receiving means is executed; a first generation means for generating a perfect encapsulated object having a method, the method which processes encapsulated data from an outside object, the object having the encapsulated data being specified by the specifying means, and which denies access to the encapsulated data by the executed program received by the receiving means; and an access control means for restricting accessible resources, prohibiting access to data specified by the specifying means from among data stored in the communication device, but authorizing access to the object generated by the first generation means when a program received by the receiving means is executed.

Further, the present invention provides a program for enabling a computer to execute a receiving step for receiving a program by a communication terminal; a specifying step for specifying data from among data stored in a storing unit, the data to be used when the program received by a receiving step is executed; a generation step for generating an object having a method, which processes encapsulated data from an outside object, the object having the encapsulated data being specified by the specified step, and which denies access to the encapsulated data by the executed program received by the receiving step; and an access control step for restricting accessible resources, prohibiting access to data specified by the specifying step from among data stored in a storing unit, but authorizing access to the object generated by the first generation step when a program received by the receiving step is executed.

According to the invention, a communication device is able to access an object having encapsulated data to be used in the execution of the received program. During the execution of the process performed on the basis of the received data, a communication device is not able to obtain the data encapsulated in an object; however, the communication device is able to process data in the object by a method belonging to the object.

Further, the present invention provides a communication device comprising a receiving means for receiving a program; a specifying means for specifying data to be used from among data stored in the communication device when a program received by the receiving means is executed; a first generation means for generating a perfect encapsulated object having a method which method processes encapsulated data from an outside object, the object having the encapsulated data being specified by the specifying means, and which denies access to the encapsulated data by the executed program received by the receiving means; a second generation means for generating an imperfect encapsulated object having at least one method which processes encapsulated data from an outside object, the object having the encapsulated data being specified by the specifying means, and which denies access to the encapsulated data by the executed program received by the receiving means; a protection information storing means for storing protection information indicating whether data protection is necessary; a determination means for determining whether an object is generated by the first generation means or the second generation means, the object having the encapsulated data and a method for processing the encapsulated data, on the basis of the protection information stored in the protection information storing means; and an access control means for restricting accessible resources, and prohibiting access to data specified by the specifying means from among data stored in the communication device, but authorizing access to the perfect encapsulated object generated by the first generation means when a program received by the receiving means is executed.

Further, the present invention provides a program for enabling a computer to execute a receiving step for receiving a program at a communication terminal; a specifying step for specifying data from among data stored in a storing unit, the data to be used when the program received by the receiving step is executed; a determination step for determining whether an object is a first object which authorizes access to the encapsulated data by the executed program or a second object which denies access to the encapsulated data by the executed program, the object having the encapsulated data and a method for processing the encapsulated data, on the basis of protection information stored in the protection information storing means the protect information, set to specified data by specifying means, indicating whether the specified data is necessary; a generation step for generating a first or a second object determined by the determination step; and an access control step for restricting accessible resources, and prohibiting access to data specified by the specifying step from among data stored in a storing unit, but authorizing access to the perfect encapsulated object generated by the first generation step when a program received by the receiving step is executed.

According to the present invention, a communication device is able to access an object having encapsulated data to be used in the execution of the received program. Further, a communication device determines an object type to be generated on the basis of protection information indicating whether data protection is necessary, the protection information set to data to be encapsulated. Further, a communication device determines whether to obtain encapsulated data in an object in the execution of the received program.

Further, the present invention may be performed by a mode which distributes the above programs to users through a communication line, or which stores the programs in a recording media such as FD, CD and a MO disk each of which is readable by computer.

BRIEF DESCRIPTION OF THE DRAWINGS

FIG. 3 is a diagram showing the data configuration of a type designation table stored in nonvolatile memory in a mobile phone according to the first embodiment.

BEST MODE OF CARRYING OUT THE PRESENT INVENTION

The first embodiment of the present invention will be described with reference to the diagrams. Like numerals denote like elements in the figures.

A-1. Configuration of the Embodiment

<1. Configuration of a Communication System>

Figure 1:
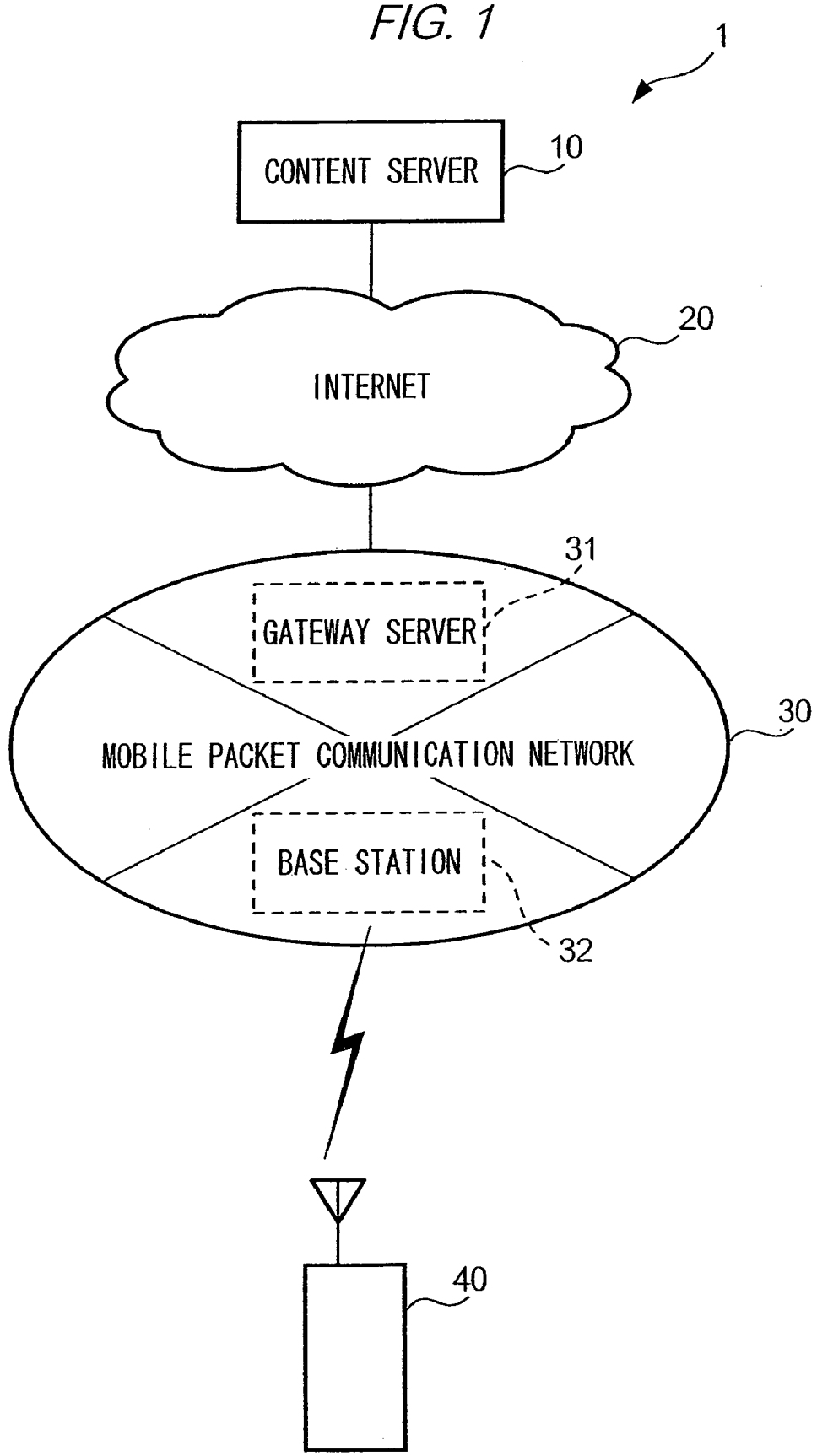
FIG. 1 is a block diagram showing the configuration of a communication system according to the first embodiment of the present invention.

FIG. 1 is a block diagram showing the configuration of a communication system 1 according to the first embodiment of the present invention. As shown in this figure, communication system 1 is comprised of a content server 10, the Internet 20, a mobile packet communication network 30, and a mobile phone 40. In general, in this communication system 1, a plurality of mobile phones 40 are located. However, for the sake of simplicity, only one mobile phone 40 is shown in FIG. 1. For the same reason, only one content server 10, one content server 31, and one base station 32 are shown in FIG. 1.

Content server 10 has a function of executing a packet communication with mobile phone 40 via the Internet 20 and mobile packet communication network 30. Various contents such as a program to be provided to mobile phone 40, or image data and music data are stored in content server 10. One of the contents is Java Application program (Hereafter, referred to as "Java AP") which can be executed in mobile phone 40. This Java AP is an application program for mobile phone 40, the application program written in a Java programming language such as Java Applet or Java Application.

Mobile packet communication network 30 is a communication network for providing a packet communication service with mobile phone 40, and has a gateway server 31 and a base station 32. Communication system 1 has a mobile communication network (not shown) in addition to mobile packet communication network 30. This mobile communication network provides a communication service for a regular mobile phone to mobile phone 40.

Gateway server 31 translates data whose communication protocols are different, for example a communication protocol for mobile packet communication network 30 and a communication protocol for the Internet 20, and relays the transmission and reception of data between mobile packet communication network 30 and the Internet 20. Further, a plurality of base stations 32 are located in a communication service area of mobile packet communication network 30, and base station 32 executes radio communication with mobile phone 40 which is active in a radio cell covered by base station 32.

Further, mobile phone 40 executes radio communication with base station 32 which covers a radio cell in which mobile phone 40 is active. Further, mobile phone 40 has a function of executing a packet communication with content server 10 through mobile packet communication network 30 and the Internet 20, and is able to download contents from content server 10.

<2. Configuration of a Mobile Phone>

Figure 2:
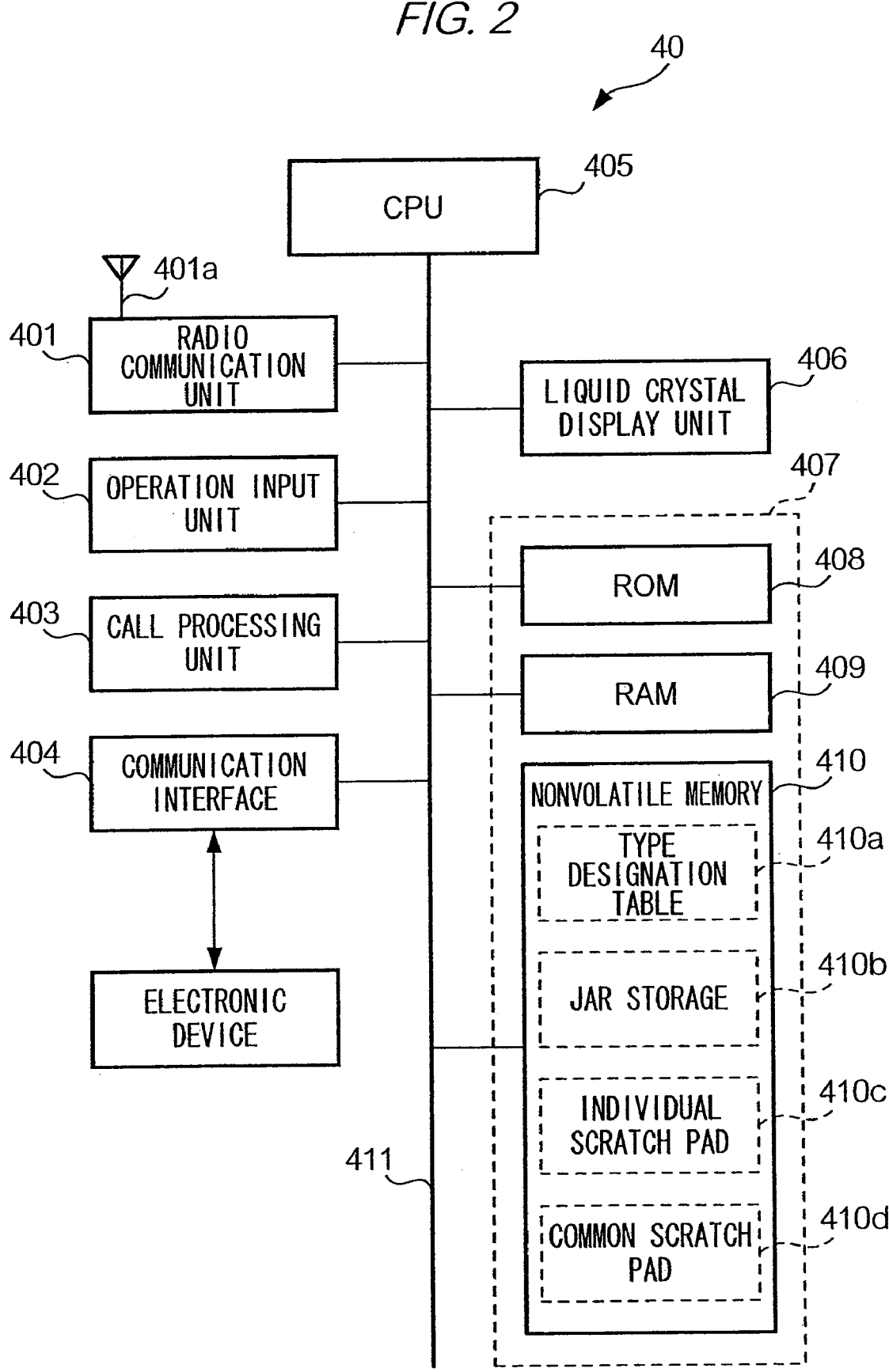
FIG. 2 is a block diagram showing the hardware configuration of a mobile phone according to the first embodiment.

FIG. 2 is a block diagram showing the hardware configuration of mobile phone 40. As shown in this figure, mobile phone 40 is comprised of a radio communication unit 401, an operation input unit 402, a call processing unit 403, a communication interface 404, and CPU 405, a liquid crystal display unit 406, and memory unit 407, which are connected to each other by bus 411.

Radio communication unit 401 has an antenna 401a, and controls radio communication with base station 32. Radio communication unit 401 generates a transmission signal by superimposing voice data or packet communication data on a carrier wave under the control of CPU 405, and transmits this signal to base station 32. Further, radio communication unit 401 receives a radio signal transmitted from base station 32 through antenna 401a, and obtains voice data for mobile phone 40 and packet communication data by demodulating this signal.

Operation input unit 402 has a plurality of keys for inputting numbers, characters, instructions for operation and the like, and outputting operation signals corresponding to key operations, to CPU 405. Further, processing unit 403 has, for example, a microphone, a speaker, a voice processing unit and the like, and executes a call process including a call connection/disconnection under the control of CPU 405.

Communication interface 404 controls a wired communication with electronic devices connected through a communication cable. This communication interface 404 may be the type which controls a close range radio communication such as infrared communication, HomeRF(Home Radio Frequency), or Bluetooth®. Further, CPU 405 controls each control unit connected via bus 411 by executing various programs stored in memory unit 407. Further, liquid crystal display unit 406 is comprised of a liquid crystal display panel and a drive circuit for executing a display control of the liquid crystal display panel.

Memory unit 407 is comprised of ROM 408, RAM 409, a nonvolatile memory 410 such as SRAM (Static RAM) and EEPROM (Electrically Erasable Programmable-ROM). Software such as an operating system (Hereafter, referred to as "OS") for mobile phone 40 and Web (World Web Wide) browser, or software for constructing Java execution environment are stored in ROM 408. Further, RAM 409 is used as a work area for CPU 405, and various programs and data executed by CPU 405 are stored in RAM 409 temporarily.

Programs designed for mobile phone 40 are stored in nonvolatile memory 410 from the time of shipping mobile phone 40. Contents such as Java AP downloaded from content server 10 are stored in nonvolatile memory 410. Additionally, various data is stored in nonvolatile memory 410, such as address book data which includes data for showing a telephone number or an e-mail address, received or transmitted e-mail data, incoming and outgoing call data, data for showing a user's bank account number to enable electronic payment, and data for showing a credit card number.

Hereafter, a program stored in ROM 408 and nonvolatile memory 410 at the time of shipping mobile phone 40 is referred to as a "Native Application" to distinguish downloaded Java AP. Identification information is given to a native application, showing the program is a native application.

Further, nonvolatile memory 410 is comprised of a type designation table 410a, a JAR storage 410b, an individual scratch pad 410c, and a common scratch pad 410d. Firstly, type designation table 410a will be described with reference to FIG. 3. As shown in FIG. 3, data name and type designation information are registered in type designation table 410a, each of which corresponds each other with regard to data stored in nonvolatile memory 410, such as address book data, e-mail data, incoming and outgoing call data, and user data, possibly used by downloaded Java AP when downloaded Java AP is performed. Type designation information is the information for designating whether an object type for data is a perfect encapsulated object or an imperfect encapsulated object. User data described above is personal information with regard to a user of mobile phone 40, for example, user's name, age, date of birth, bank account number, and credit card number.

As shown in FIG. 3, type designation information is 1 bit data whose information value is 1 or 0. When the value of type designation information is set to 1, an object type is designated as a perfect encapsulated object, and when the value of type designation information is set to 0, an object type is designated as an imperfect encapsulated object.

An encapsulated object is an object having one or more than one item of encapsulated data (Information is encapsulated) and at least one method for operating encapsulated data from an outside object. Then, a perfect encapsulated object is an object whose configuration does not have methods which authorize access to encapsulated data by an executed program (E.g. Downloaded Java Application), for the object. An imperfect encapsulated object is an object configured to have at least one method for authorizing access encapsulated data by an executed program for the object. The difference between a perfect encapsulated object and an imperfect encapsulated object is whether an object has methods which authorize access to encapsulated data in an object by an executed program.

That is to say, type designation table 410a in FIG. 3 shows that each item of data is processed as a perfect encapsulated object, or an imperfect encapsulated object. For example, in FIG. 3, address book data, e-mail data, incoming and outgoing call data, and user data are especially important data for security reasons among data stored in mobile phone 40. On the other hand, Java AP downloaded in mobile phone 40 is a program which is not secure. Accordingly, although Java AP generated by a malicious person is downloaded in mobile phone 40, important data must be protected such that it cannot be accessed from outside mobile phone 40 through Java AP.

Consequently, important data is processed as a perfect encapsulated object, and it is necessary to deny access to data by downloaded Java AP. For the above reasons, in type designation table 410a in FIG. 3, "1" (Perfect Encapsulated Object) is set to address book data, e-mail data, incoming and outgoing call data, and user data as a value for type designation information.

Further, in type designation table 410a in FIG. 3, content A and content B are contents such as image data or music data, both of which are downloaded from content server 10. A copyright protection flag is provided to the contents by content providers. A copyright protection flag is 1 bit data whose flag value is 1 or 0. When the value of a copyright protection flag is set to 1, copyright of the contents to which a flag is provided must be protected, and when the value of a copyright protection flag is set to 0, copyright of the contents to which a flag is provided must be abandoned.

With regard to the contents whose copyright must be protected, if the content data is provided to downloaded Java AP, the contents may be used by Java AP in a manner which is not authorized by content providers, or transmitted outside mobile phone 40 through Java AP. Accordingly, content data is processed as a perfect encapsulated object, the content data to which "1" is provided as a value of copyright protection flag, and it is necessary to deny access to the content data by downloaded Java AP. For the above reason, in type designation table 410*a*, "1" is set to content A as a value of type designation information.

On the other hand, with regard to the content data to which "0" is provided, since its copyright is abandoned, it is not necessary to process the content data as a perfect encapsulated object. In this case, it is necessary to authorize access to the content data by downloaded Java AP, thereby providing even more diversification to Java AP. Therefore, "0" (imperfect encapsulated object) is set to content B as a value of type designation information.

Further, in type designation table 410*a*, "1" is set to address book data, e-mail data, incoming and outgoing call data, and user data in advance as a value of type designation information. Further, with regard to downloaded contents, when contents are downloaded to mobile phone 40, a value of type designation information is determined by CPU 405, the value corresponding to a value of a copyright protection flag provided to contents. Then, the type designation information is registered with type designation table 410*a* along with content identification information (data name)

Further, with regard to data generated in mobile phone 40, or with regard to image data and music data generated by a user by using PC and downloaded to mobile phone 40 through a communication interface 404, a user is able to set an object type for the data by operation input, the object type which is a perfect encapsulated type or an imperfect encapsulated type. Further, by input operation, a user may display the details of type designation table 410*a* on a crystal display, and modify type designation information on each item of data except for the content data to which a copyright protection flag is provided.

Next, in FIG. 2, nonvolatile memory 410 is comprised of a JAR (Java Archive) storage 410*b*, an individual scratch pad 410*c*, and a common scratch pad 410*d* in addition to type designation table 410*a*. Here, Java AP to be downloaded into mobile phone 40 will be described before individual scratch pad 410*c* and common scratch pad 410*c*. Java AP is comprised of a JAR file which is a main program for Java AP, and an image file and a sound file to be used together in the execution of the main program for Java AP, along with an ADF (Application Describer File) in which various control information is written, for installing and activating JAR file and controlling the network access.

Storage area for Java AP is installed in JAR storage 410*b* and individual scratch pad 410*c* per downloaded Java AP. JAR file for Java AP is stored in each storage area of JAR storage 410*b*. Further, for example, generated data for Java AP in accordance with the usage of Java AP, such as past score data or save data, is stored in each storage area of individual scratch pad 410*c* if Java AP is a game program. Further, data which a plurality of Java Application programs commonly uses is stored in common scratch pad 410*d*.

Further, when Java AP is executed in mobile phone 40 after the completion of downloading Java AP, resources which mobile phone 40 is able to access are restricted to a content server 10 from which programs are downloaded, a storage area assigned to Java AP, JAR storage 410*b* and individual scratch pad 410*c*, and common scratch pad 410*d*, but mobile phone 40 is not authorized to access other resources.

<3. Java Execution Environment>

Figure 4:
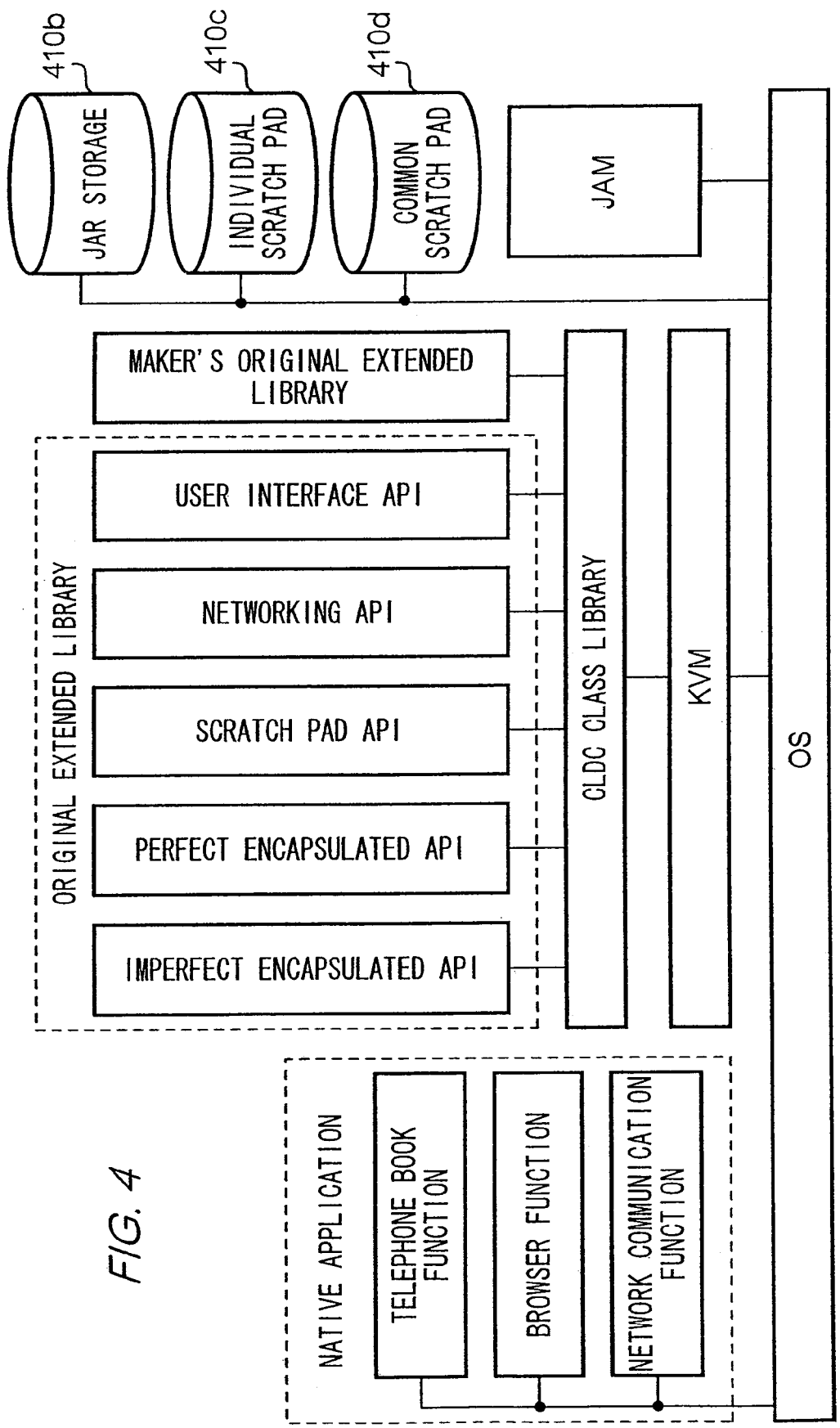
FIG. 4 is a diagram explaining execution environment of Java AP in a mobile phone according to the first embodiment.

FIG. 4 is a diagram explaining execution environment of Java AP in mobile phone 40. In this figure, software for constructing the execution environment of Java AP (KVM (K Virtual Machine)), a configuration (CLDC(Connected Limited Device Configuration)), and a profile (an original extended library originally developed by a telecommunication carrier) are stored in mobile phone 40.

Further, J2ME(Java 2 Micro Edition) is installed in mobile phone 40, the J2ME comprised of an original extension profile originally developed by telecommunication companies as a profile.

KVM is a JVM (Java Virtual Machine) redesigned for a small electronic device, and translates into an instruction code which CPU405 is able to interpret/execute through OS, a byte code which is execution file format of Java AP. Further, CLDC class library is a class library for CLDC.

The original extended library is a class library for providing functions specified for a mobile phone on the basis of CLDC. For example, user interface API (Application Program Interface), Networking API, Scratch Pad API, Perfect Encapsulated API, Imperfect Encapsulated API, and the like are included in the original extended library.

Here, user interface API is API for supporting user interface functions of mobile phone 40, and network API is API for supporting access to network resources designated by URL (Uniform Resource Locator). Further, scratch pad API is an API for supporting writing in or reading out data for individual scratch pad 410*c* and common scratch pad 410*d*. Further, perfect encapsulated API is an API for generating a perfect encapsulated object, and an imperfect encapsulated API is an API for generating an imperfect encapsulated object.

The above programs are installed in mobile phone 40 in various manners. For example, the programs are installed in a mobile phone prior to shipping from a factory. Alternatively, the programs are downloaded from a site in the network, and installed in a mobile phone, or the programs are downloaded to a PC other than a mobile phone. In this case, the programs are stored in a storage media readable by computer such as a FD, a CD, and a MO disk, and the programs are provided to a user. Then, the programs are installed in a PC by a user.

Further, mobile phone 40 has a maker's original extended library in addition to CLDC class library and original extended library. The maker's original extended library is a class library via which each maker of mobile phone 40 provides original functions.

Next, JAM (Java Application Manager) has functions to process Java AP downloaded in mobile phone 40, a perfect encapsulated object, an imperfect encapsulated object and the like under the control of OS.

For example, Java has functions to update and to delete the installation of Java AP, to display a list of Java AP stored in nonvolatile memory 410, to process (e.g. activation and forced termination) of Java AP, to restrict the access by mobile phone 40 in the execution of Java AP, and to generate, to update and to delete a perfect encapsulated object and an imperfect encapsulated object.

Further, as shown in FIG. 4, a native application which offers a telephone book function, a browser function, or the like is directly executed under the control of an Os.

<4. Configuration of an Encapsulated Object>

Figure 5:
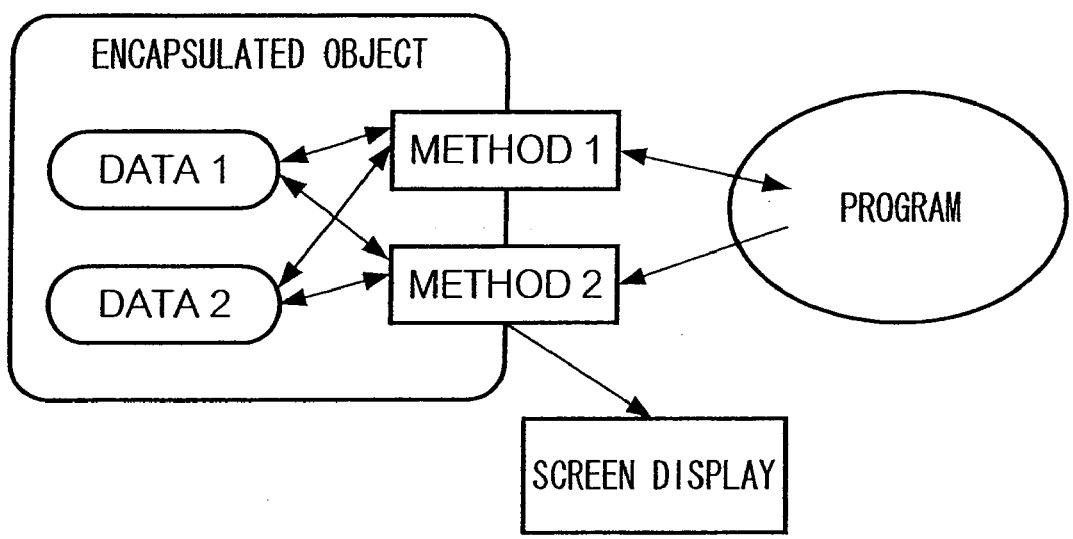
FIG. 5 is a view explaining an encapsulated object in a mobile phone according to the first embodiment.

Next, an encapsulated object will be described. FIG. 5 is a view explaining an encapsulated object. As shown in this figure, the encapsulated object is comprised of more than one item of encapsulated data, and more than one method for making possible operation of each item of encapsulated data from the outside object.

The object is a set of data ("Field" in Java programming language) and operation ("Method" in Java programming language). In Java programming language, an access indicator "private" declaring that each field in the object is a private field, is used for encapsulation of data stored in the private field. An encapsulated object is made via the encapsulation.

As shown in this figure, an encapsulated object having two items of data, data 1 and data 2, and two methods, method 1 and method 2 is shown. Since data 1 and data 2 are encapsulated in the encapsulated object, data 1 and data 2 are not directly read out or written in from an outside object. Consequently, when the downloaded program accesses data 1 and data 2 in the encapsulated object, the downloaded program has to instruct the encapsulated object to process for objective data 1 and data 2 by using method 1 and method 2.

In this figure, when method 1 is, for example, a method for providing designated data to the downloaded program, the downloaded program is able to obtain optional data 1 and data 2 in the encapsulated object by using method 1. Further, when method 2 in this figure is, for example, a method for displaying the designated data on a liquid crystal display, the downloaded program is able to display optional data 1 and data 2 in the encapsulated object by using method 2. The important point is that the program, which has displayed optional data 1 and data 2 of the encapsulated object on the display by using method 2, instructs the encapsulated object to display optional data 1 and data 2 by using method 2, even though the program itself does not obtain the data to be displayed.

More specifically, in the case of an encapsulated object (perfect encapsulated object) which does not have methods for authorizing data access by the downloaded program, the downloaded program is not able to obtain data stored in the encapsulated object, but is able to control data stored in the encapsulated object by using the methods belonging to the encapsulated object.

Accordingly, although the downloaded program is a program which is not secure (e.g. Java AP), when data such as address book data or e-mail data is processed as a perfect encapsulated object, data is not accessible by the downloaded program. Therefore, mobile phone 40 is secure. Further, although data such as address book data or e-mail data is not generally accessible for security reasons, the program is able to process (access) the data by using methods belonging to the encapsulated object.

In this embodiment, data is processed as a perfect encapsulated object, to which data "1" is set as a value of type designation information, for example, important data for security reasons such as address book data, e-mail data, incoming and outgoing call data or user data, and contents whose copyright must be protected. On the other hand, data is processed as an imperfect encapsulated object, to which data "0" is set as a value of type designation information, for example, data whose security is not important, or contents whose copyright is abandoned. Further, downloaded Java AP is authorized to access a perfect encapsulated object or an imperfect encapsulated object.

Figure 6:
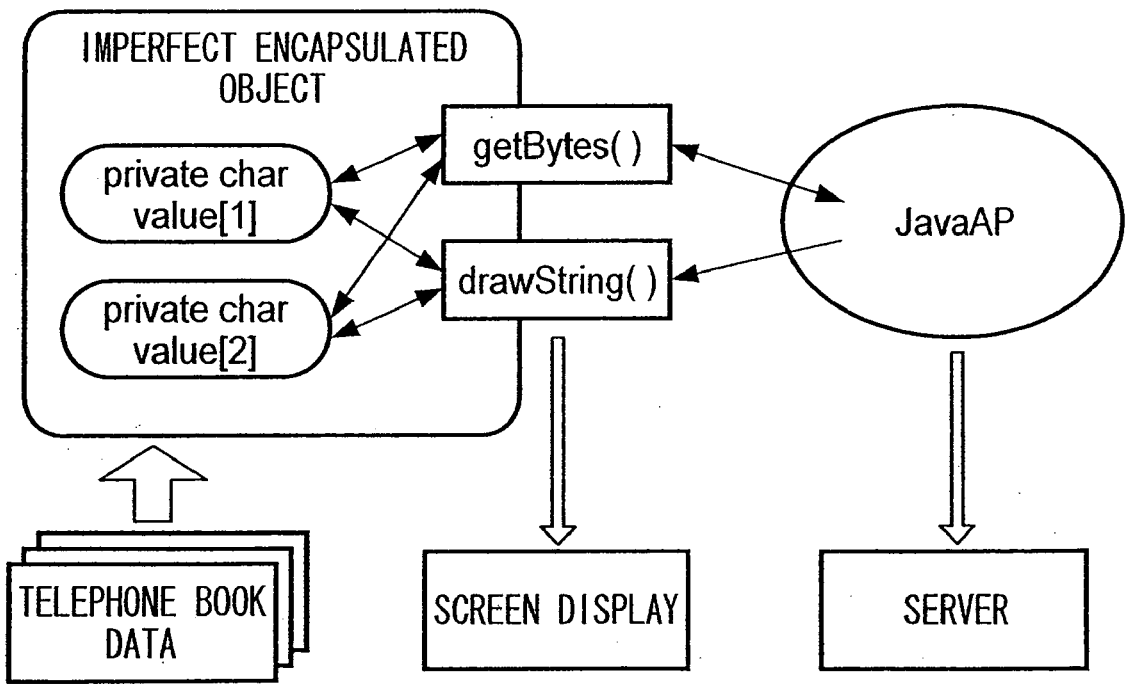
FIG. 6 is a view exemplifying an imperfect encapsulated object in a mobile phone according to the first embodiment.

FIG. 6 is a view exemplifying an imperfect encapsulated object with regard to telephone book data. In this embodiment, telephone book data is usually processed as a perfect encapsulated object as the data is important for security reasons. However, for reasons of comparison, a case will be described below wherein telephone book data is processed as an imperfect encapsulated object.

In Java programming language, encapsulation of data to be stored in a private field is executed by declaring each field in the object to be a private field via an access qualifier known as "private". In other words, every field in the object is a private field; data stored in a private field cannot be read out from the outside of an object. In such a case, to enable the program which performs the instruction to access data from the outside object, the program which performs the instruction needs to instruct the object to process (access) data stored in each private field by using methods belonging to the object.

Two private fields are installed in an imperfect encapsulated object in this figure, and character string data of a telephone book, "private char value[1]" and "private char value[2]" are stored in an imperfect encapsulated object. Further, an imperfect encapsulated object has two methods known as "getBytes( )" and "drawString( )". getBytes( ) is a method for providing data stored in an object in a byte array form to the program which performs the instruction. Consequently, downloaded Java AP is able to obtain a character string data of a telephone book, "private char value[1]" and "private char value[2]" stored in an imperfect encapsulated object by using the method, "getBytes( )". Additionally, Java AP is able to transmit the obtained character string data of a telephone book stored in an imperfect encapsulated object to content server 10(A server which performs downloading Java AP).

Further, drawstring( ) is a method for displaying data stored in an object on a liquid crystal display of mobile phone 40. Java AP is able to display character string data of a telephone book ("private char value[1]" and "private char value[2]") stored in an imperfect encapsulated object on a liquid crystal display of mobile phone 40.

Figure 7:
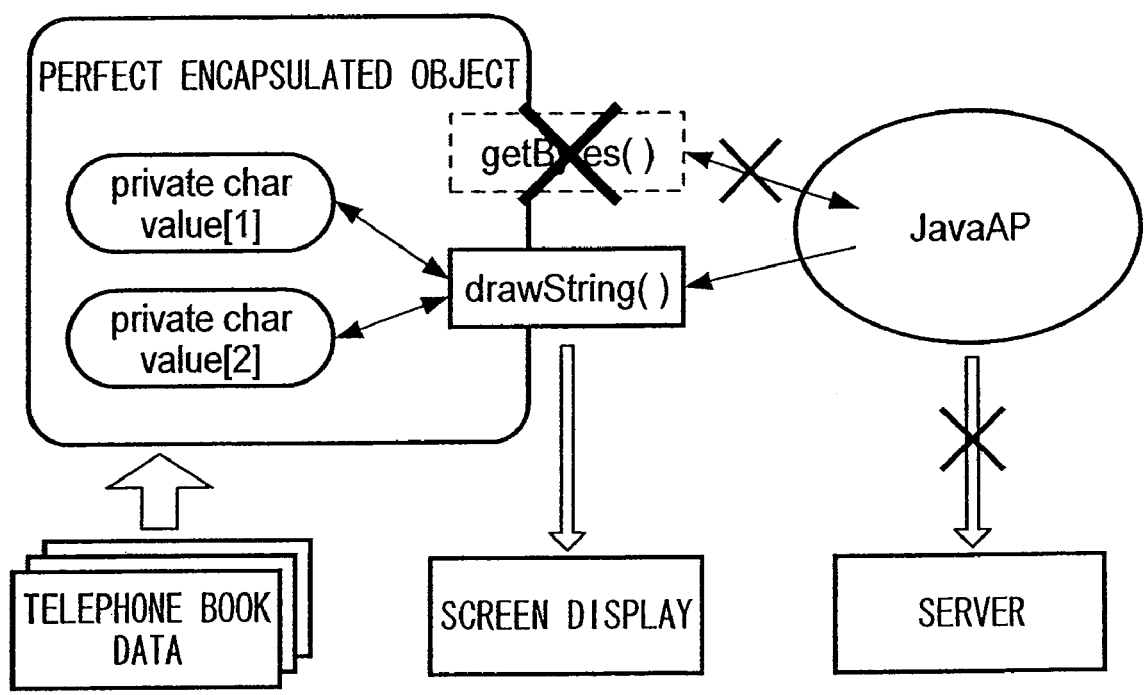
FIG. 7 is a view exemplifying a perfect encapsulated object in a mobile phone according to the first embodiment.

FIG. 7 is a view exemplifying a perfect encapsulated object with regard to telephone book data. The difference between a perfect encapsulated object in FIG. 7 and an imperfect encapsulated object in FIG. 6 is that a perfect encapsulated object does not have methods for authorizing access to data stored in an object by an executed program.

More specifically, because a perfect encapsulated object is "perfectly" encapsulated, a perfect encapsulated object does not have methods for authorizing access to data stored in an object by an executed program. Accordingly, the downloaded Java AP is able to display character string data of a telephone book ("private char value[1]" and "private char value[2]") stored in an imperfect encapsulated object on a liquid crystal display of mobile phone 40 by using the method known as "drawstring( )", but is unable to obtain character string data of a telephone book. For the above reason, even though a Java AP generated by a malicious third person is downloaded in mobile phone 40, the Java AP for stealing data, or telephone book data, the data is not accessed by such Java AP. Therefore, telephone book data cannot be transmitted to outside mobile phone 40 (e.g. to a Server).

The character string data of a telephone book stored in the object is displayed by using the method, "drawstring( )", a perfect encapsulated object and an imperfect encapsulated object display the character string data of a telephone book on a liquid crystal display by using a display control program stored in ROM 408 or nonvolatile memory 410 as a native application. If Java AP were able to obtain the displayed data by using the display control program, there would be no advantage to using a perfect encapsulated object and an imperfect encapsulated object.

However, when downloaded Java AP is executed, mobile phone 40 is restricted to accessing resources in the execution of Java AP by an access restriction function of JAM described above. Since, in executing Java AP, a display control program is not included in the resources which mobile phone 40 is authorized to access, it is impossible for Java AP to obtain displayed data from a display control program.

Further, it is plausible that an object may be encapsulated at the level of programming language, or encapsulated at the level of an executable code (machine language or byte code). If it is encapsulated in a perfect manner at the level of programming language, however, it can not also be encapsulated in a perfect manner at the level of an executable code, and therefore data is not encapsulated in a perfect manner. As an example, a program using C++ (programming language) is able to generate an encapsulated object having private fields, but the program using C++ is able to achieve perfect encapsulation only at the level of programming language.

More specifically, when the program using C++ declares every field stored in the object as a private field, and generates an encapsulated object, the program does not compile a source code for reading and writing data directly stored in a private field. That is to say, an execution code is not generated for a compile error.

It should be noted that an execution code is determined only by a compiler. For example, a third person having malicious intent is able to generate an executable code for reading and writing data directly stored in a private field of an object by modifying a compiler. Further, such a person is able to create a program for generating an executable code which reads out data stored in an object by a method of user-input and the like. Moreover, it is possible to obtain data stored in an object only if a person obtains direct access to a memory by using a pointer.

On the other hand, with regard to Java, a field declared as a private field is compiled using a Java byte code showing the field has a private attribute. Even when KVM expands a class file to RAM 409, the field keeps a private attribute. Accordingly, if a third person generates a byte code for reading out data stored in a private field of an object by modifying a compiler, KVM or JAM detects the code generation and therefore, the third person cannot obtain the data stored in the object. Further, Java does not support a pointer, and therefore, a malicious third person cannot obtain data stored in an object by gaining direct access to a memory with a pointer.

For the above reasons, in Java, an object is encapsulated in a perfect manner at the level of a byte code as well as at the level of programming language. With regard to data encapsulation, besides "private", an access identifier such as "protected" or "package" are used.

The above describes the configuration of communication system 1 according to the present embodiment.

A-2. Operation of the Embodiments

Next, the operation of the embodiments will be described.

It is assumed that mobile phone 40 performs a packet communication with content server 10 through mobile packet communication network 30 and the Internet 20, and downloads Java AP from content server 10, and stores it in nonvolatile memory 410. Further, it is assumed that address book data, electronic mail data and user data are stored in nonvolatile memory 410 in addition to the downloaded Java AP (Contents), and type designation information for the above data is registered with type designation table 410a.

Further, in type designation table 410a, "1" is set to address book data, e-mail data, incoming and outgoing call data, and user data in advance as a value of type designation information. Further, with regard to downloaded contents, when contents are downloaded to mobile phone 40, a value of type designation information is determined by CPU 405, the value corresponding to a value of a copyright protection flag provided to contents. Then, type designation information and content names are registered with type designation table 410a.

<1. Object Generation Process>

The object generation process executed by CPU 405 in mobile phone 40 ill be described with reference to FIG. 8. The object generation process is executed by CPU 405 as a JAM function, and, for example, is executed when a program to be executed is designated from a program list displayed on a display by an operation input. The embodiment for instructing to execute a program is not restricted to an operation input; for example, when executing a program is instructed at a predetermined time, when executing a program is instructed by other programs which have already been executed, or when executing a program is instructed via e-mail and the like from outside mobile phone 40.

Figure 8:
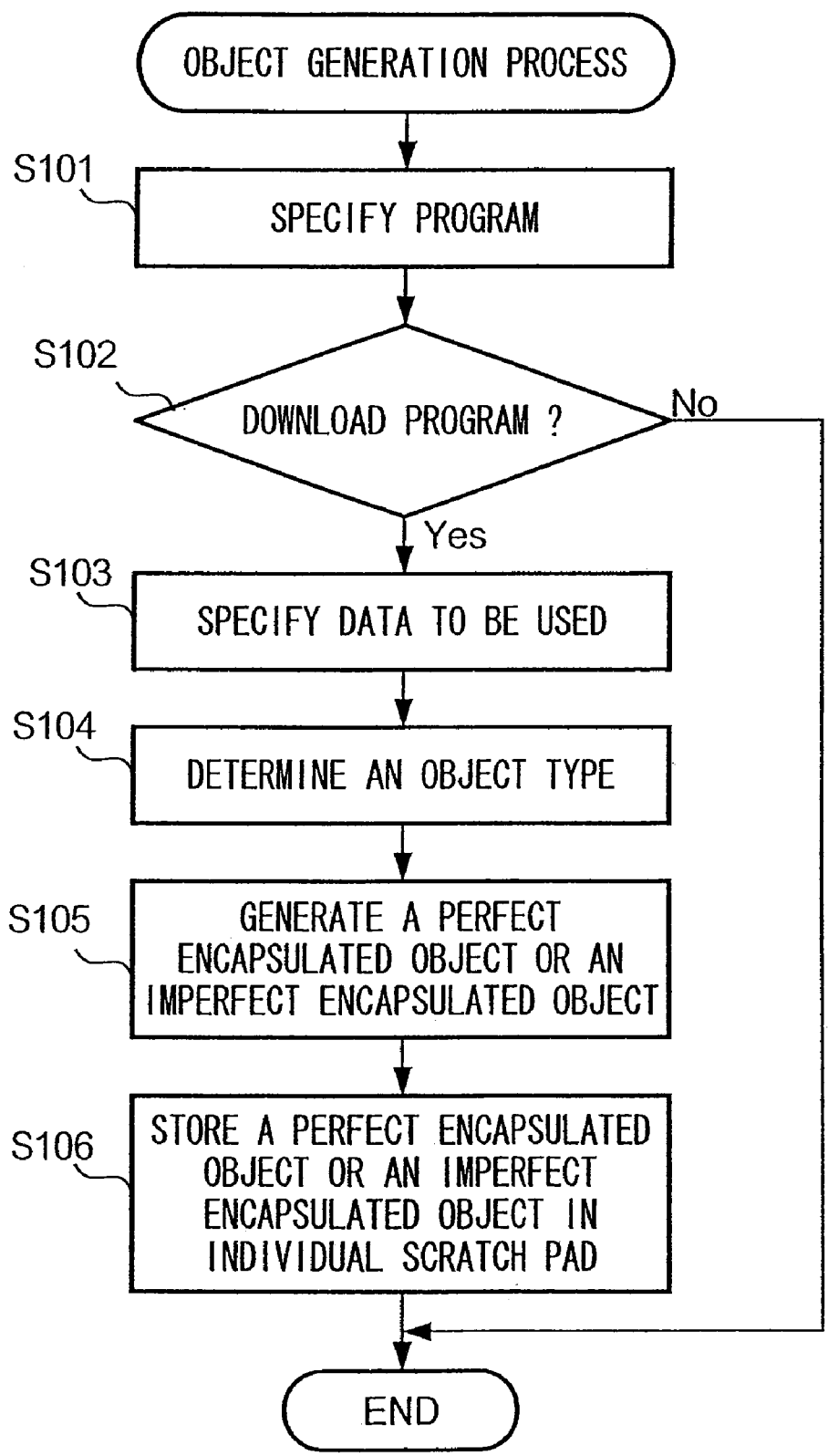
FIG. 8 is a flowchart explaining the operation of an object generating process executed by CPU in a mobile phone according to the first embodiment.

As shown in FIG. 8, CPU 405 in mobile phone 40 specifies a designated program as an executed program via an input operation (Step S101). Next, CPU 405 determines whether the specified program is downloaded Java AP, or a native application (Step S102). As described above, identification information, for showing that a program is a native application, is provided to a native application. Consequently, CPU 405 determines whether a program is downloaded Java AP or a native application, by determining whether the above identification information is provided to a program.

As a result, if CPU 405 determines that the program is a native application (Step S102:No), CPU 405 terminates an object generation process, and activates execution of the designated native application as a program to be executed. Then, CPU 405 performs processing on the basis of the executed native application.

In this case, when the program to be executed is a native application, it is not necessary to use a perfect encapsulated object or an imperfect encapsulated object, or to process an access restriction function of JAM in the execution of a native application. Consequently, when a native application is executed, an access restriction by JAM is not executed. Therefore, a native application is able to access optional resources stored in mobile phone 40, or optional resources on the network.

On the other hand, when CPU 405 determines that the program is the downloaded Java AP (Step S102:Yes), CPU 405 specifies data to be used in the execution of Java AP from various data stored in nonvolatile memory 410 by, for example, analyzing program contents for Java AP (Step S103). Further, CPU 405 specifies a method to be encapsulated along with the data to be used. When Java AP specifies data to be used, the data stored in a JAR file of Java AP is excluded as data not specified since the data stored in a JAR file is data prepared by a content provider for providing Java AP as data necessary for executing Java AP.

Next, CPU 405 determines whether the object type for processing the specified data is "a perfect encapsulated object" or "an imperfect encapsulated object" on the basis of a value of type designation information of the data specified above by referring to type designation table 410a (FIG. 3) (Step S104). For example, if Java AP uses address book data, CPU405 refers to type designation table 410a and determines an object type as "a perfect encapsulated object", the object type for managing address book data. Further, if Java AP uses content B (a copyright protection flag is "0"), CPU405 determines an object type as "an imperfect encapsulated object", the object type for managing content B.

CPU 405 generates a perfect encapsulated object or an imperfect encapsulated object on the basis of the specified data at Step S103 and the determined object type at Step S104 (Step 105). For example, CPU 405 activates a perfect encapsulated API in an original extended library in the case of specifying address book data (type designation information "1") in Step 103. A perfect encapsulated API selects a method specified at the time of specifying the data from methods stored in a perfect encapsulated API. Then, CPU 405 encapsulates data and a method, and generates a perfect encapsulated object for address book data. Further, CPU 405 activates an imperfect encapsulated API in an original extended library, and activates an imperfect encapsulated object for content B in the case of specifying content B in Step 103.

Next, CPU 405 stores an object in common scratch pad 410*d*, the generated perfect encapsulated object or the generated imperfect encapsulated object (Step S106), and terminates the object generating process. The generated perfect encapsulated object or imperfect encapsulated object in Step S105 may be stored in common scratch pad 410*c*.

Further, in the case of specifying a plurality of data used by Java AP in Step 103, CPU 405 repeats the process from S104 to S106 per specified data to generate a perfect encapsulated object or an imperfect encapsulated object and store these objects in common scratch pad 410*d* per the specified data. Then, CPU 405 activates a Java AP designated as an executable program and initiates the process on the basis of the program after terminating an object generation process.

<2. Access Management Process>

Next, the access management process executed by CPU in mobile phone 40 will be described with reference to FIG. 9. The access management process is executed by CPU 405 as a JAM a function, and is executed as an interruption process when an access request is generated in the execution process of the downloaded Java AP.

Figure 9:
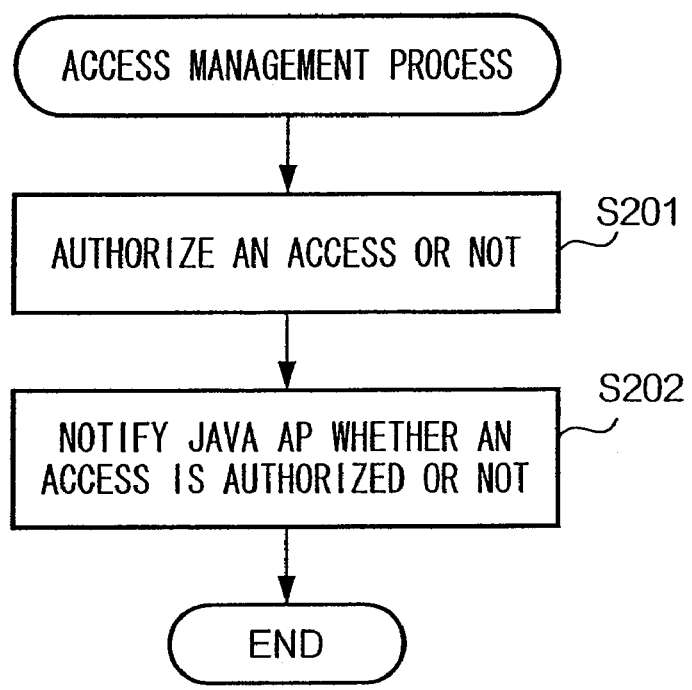
FIG. 9 is a flowchart explaining the access management process executed by CPU in a mobile phone according to the first embodiment.

As shown in FIG. 9, CPU 405 in mobile phone 40 distinguishes whether a requested access point is within the range of the pre-authorized resources, and determines whether an access (to the resources) is authorized (Step S201). To determine authorization of an access, when the downloaded Java AP is executed, CPU 405 restricts accessible resources in the execution of Java AP to the following: content server 10 which downloads Java AP designated by a URL written into ADF of Java AP, JAR storage 410*b* assigned to Java AP, storage area into individual scratch pad 410*c*, and common scratch pad 410*d*.

Accordingly, CPU 405 authorizes an access in the case that the requested access point(s) is(are) any of the resources described above. However, CPU 405 does not authorize an access if the requested access point(s) is (are) not among the resource(s) described above.

Next, CPU 405 notifies Java AP, which requests downloading an access, whether the access is authorized (Step S202), and terminates an access management process. Further, when Java AP in execution receives an authorization result executed by JAM, Java AP executes the process on the basis of the access request when the access is authorized; however, Java AP cancels the process on the basis of the access request when the access is not authorized.

When CPU 405 in mobile phone 40 executes the downloaded Java AP, CPU 405 activates Java AP after executing the object generation process shown in FIG. 8. Further, in the execution of the downloaded Java AP, CPU 405 executes the access management process shown in FIG. 9. Accordingly, mobile phone 40 is always restricted to access resources in the execution of the downloaded Java AP. As an example, mobile phone 40 cannot access address book data, e-mail data, incoming and outgoing call data, user data, and other data such as content, each of which stored in nonvolatile memory 410.

For the above reason, CPU 405 in mobile phone 40 specifies data to be used by Java AP to be activated in the process of the object generation process, generates a perfect encapsulated object or an imperfect encapsulated object for the specified data, and stores it in common scratch pad 410*d*. As described above, common scratch pad 410*d* is the resource which mobile phone 40 is authorized to access even though the access is restricted by JAM. Java AP downloaded into mobile phone 40 is generated in such a manner that Java AP accesses a perfect encapsulated object or an imperfect encapsulated object both of which are stored in common scratch pad 410*d*, and instructs the object to process data in the object by using methods belonging to the object.

For example, when a Java AP using address book data is generated, a perfect encapsulated object for address book data is generated by the object generation process described above, and a perfect encapsulated object is stored in common scratch pad 410*d*. Further, a Java AP instructs the generated perfect encapsulated object for address book data to process data in the object by using the methods belonging to the object. Consequently, a part of address book data belonging to a perfect encapsulated object is displayed on a display, but the data belonging to a perfect encapsulated object is not accessed by a Java AP.

In the prior art, Java AP was not able to access address book data, e-mail data, incoming and outgoing call data, user data or the like to ensure data security with respect to the downloaded Java AP. Conversely, according to the present invention, since data is not accessed by Java AP by using a perfect encapsulated object, it is possible to ensure security with respect to the downloaded Java AP, and to display data, which was not authorized to be accessed, via a perfect encapsulated object. Consequently, in the present invention, the downloaded Java AP is able to execute various functions in mobile phone 40. In other words, Java AP functions are enriched.

Further, when contents and Java AP are activated, the contents whose copyright are abandoned, and the Java AP using data which is not important for security reasons or set to "0" as type designation information, an imperfect encapsulated object is generated and stored in common scratch pad 410*d*. Unlike in the case of a perfect encapsulated object, data belonging to an imperfect encapsulated object may be accessed by Java AP in this case.

That is to say, although downloaded Java AP is a program which is not secure, with regard to data whose copyright is abandoned, or data which is not important for security reasons, such data is authorized to be accessed by Java AP by processing data as an imperfect encapsulated object. It is obvious to improve a diversification of Java AP when data is authorized to be accessed by Java AP. As compared to using only a perfect encapsulated object, a diversification of Java AP is further improved by using a perfect encapsulated object and an imperfect encapsulated object case by case in accordance with importance of data security or necessity of copyright protection of contents.

<3. Java AP Termination Process>

Next, the Java AP termination process executed by CPU 405 in mobile phone 40 will be described with reference to FIG. 10. The Java AP termination process is executed by CPU 405 as a JAM function, and executed as an interruption process when an execution termination request of Java AP is generated.

Figure 10:
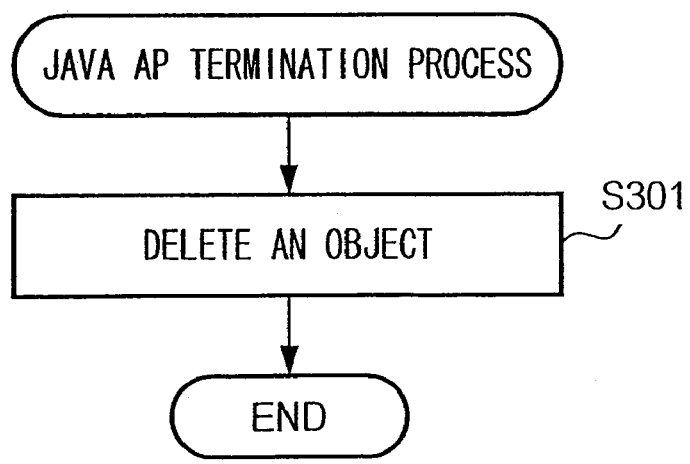
FIG. 10 is a flowchart explaining the termination operation of Java AP executed by CPU in a mobile phone according to the first embodiment.

As shown in FIG. 10, CPU 405 in mobile phone 40 deletes a perfect encapsulated object and an imperfect encapsulated object stored in common scratch pad 410*d* when a Java AP termination request is generated (Step S301). A perfect encapsulated object and an imperfect encapsulated object deleted at Step S301 are generated in the object generation process (refer to FIG. 8) in the activation process of Java AP, and stored in common scratch pad 410*d*. CPU 405 terminates Java AP termination process after deleting the above objects from common scratch pad 410*d*.

Further, by generating a perfect encapsulated object and an imperfect encapsulated object and storing the objects in common scratch pad 410*d* when downloaded Java AP is activated, and by deleting a perfect encapsulated object and an imperfect encapsulated object from common scratch pad 410*d* when the execution of downloaded Java AP is terminated, efficient use of memory resources in mobile phone 40 is ensured as it is not always necessary to store the objects in common scratch pad 410*d*.

Further, mobile phone 40 executes a process related to the present invention (object generation process, access management process, Java AP termination process) in accordance with a program stored in ROM 408 or nonvolatile memory 410, but a program for executing the above process may be provided to mobile phone 40 by communication. Further, a program for executing the above process may be provided to mobile phone 40 by using a recording media such as a optional recording media, a disc recording media, and a semiconductor memory, but a recording media drive for reading out a program from a recording media is necessary in the case of providing a program to mobile phone 40 by a recording media.

B. Modifications

While the invention has been described with reference to its currently best-known modes of operation and embodiments, other modes, embodiments and advantages of the present invention will be apparent to those skilled in the art and are contemplated herein. Although those skilled in the art would recognize that other embodiments of the present invention are envisioned, the following claims define the broad scope of the present invention. Further, the present invention may have the following modifications.

<Modification 1>

In the above embodiment, the case using a perfect encapsulated object or an imperfect encapsulated object is described, however, a case using only a perfect encapsulated object may be described. That is to say, data to be used by downloaded Java AP may be processed as a perfect encapsulated object. In this case, type designation information is not necessary. Further, type designation information table 410*a* is used in the above embodiment; however, type designation information table 410*a* is not necessary if type designation information is provided to address book data, e-mail data, and contents.

<Modification 2>

In the above embodiments, a perfect encapsulated object or an imperfect encapsulated object is generated in the case of instructing to execute the downloaded Java AP, the timing for generating a perfect encapsulated object and an imperfect encapsulated object is not restricted to only at the time of instructing of execution of Java AP.

For example, at the time of turning on mobile phone 40, a perfect encapsulated object for data or an imperfect encapsulated object for data may be generated by referring to type designation information table 410*a*. In this case, when original data such as address book data, e-mail data, incoming and outgoing call data, and user data is updated, the data in a perfect encapsulated object or an imperfect encapsulated object needs to be updated in accordance with updating details, the perfect encapsulated object and the imperfect encapsulated object both being stored in common scratch pad 410*d*.

Accordingly, to execute generation process of a perfect encapsulated object for data or an imperfect encapsulated object at the time of activating mobile phone 40, it is necessary that API is provided with an original extended library in accordance with updating details of original data, the API for updating encapsulated data in an object. Further, when a perfect encapsulated object or an imperfect encapsulated object is stored in common scratch pad 410*d* continuously, it is obvious that the deletion of a perfect encapsulated object or an imperfect encapsulated object is not necessary from common scratch pad 410*d* in accordance with the termination of executing a Java AP.

<Modification 3>

In the above embodiment, it is further possible that security level information is provided to data, the security level information for indicating importance of security which is "1" (importance "High") to "5" (importance "Low"), and data belonging to security level information of "1" to "3" is processed as a perfect encapsulated object while data belonging to security level information of "4" to "5" is processed as an imperfect encapsulated object.

<Modification 4>

With regard to Java AP downloaded to mobile phone 40, if Java AP is judged by a third party such as a telecommunication company managing mobile packet communication network 30, or CA(Certified Authority) and authorized as a program which meets some criteria, Java AP is regarded as a secure program as well as a native application.

Accordingly, if Java AP is authorized by a third party, even downloaded Java AP may obtain data to be used directly from nonvolatile memory 410. Of course, identification information is provided to Java AP authorized by a third party, the identification information for indicating that the Java AP is an authorized program by a third party. That is to say, in mobile phone 40, to determine whether downloaded J mobile packet Java AP is an authorized program by a third party, it is necessary to check whether identification information is provided to downloaded Java AP.

<Modification 5>

In the above embodiment, it is configured such that content server 10 is connected to the Internet 20. However, it is also configured such that content server 10 is directly connected to gateway server 31 in mobile packet communication network 30 through an exclusive line. Further, it is configured that gateway server 31 has a function of content server 10. Further, it is configured that content server 10 is installed in mobile packet communication network 30.

<Modification 6>

Figure 11:
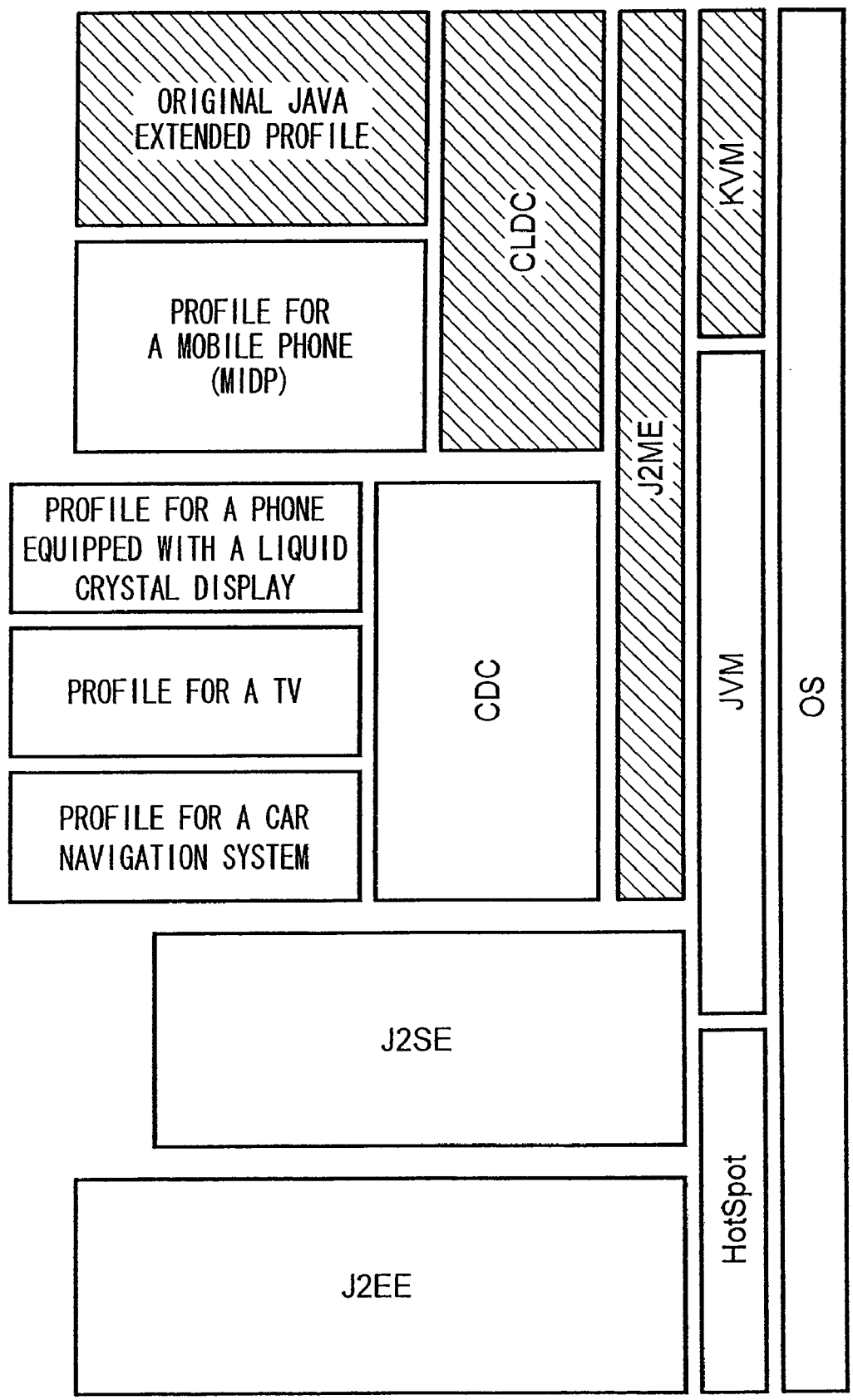
FIG. 11 is a diagram explaining the modifications of the Java execution environment according to the modification 6 of the present invention.

In the above embodiments, as shown by hatching in FIG. 11, it is described that the present invention is applied to mobile phone 40 comprised of KVM, CLDC as a configuration, and J2ME having an original Java extended profile. However, a Java execution environment is not restricted only to a combination of KVM and J2ME. Further, a communication device used in the present invention is not restricted to a mobile phone.

For example, as shown in the figure, MIDP (Mobile Information Device Profile) may be used as a J2ME profile instead of an original Java extended profile. Further, JVM instead of KVM, CDC (Connected Device Configuration) instead of CLDC as a configuration for J2ME may be used in the configuration. Moreover, a profile for a phone equipped with a liquid crystal display, a profile for a TV, a profile for a car navigation system and the like may be used as a profile for J2ME in the configuration. Further, HotSpot, J2SE(Java 2 Standard Edition), or J2EE(Java 2 Enterprise Edition) may be used in the configuration.

Figure 12:
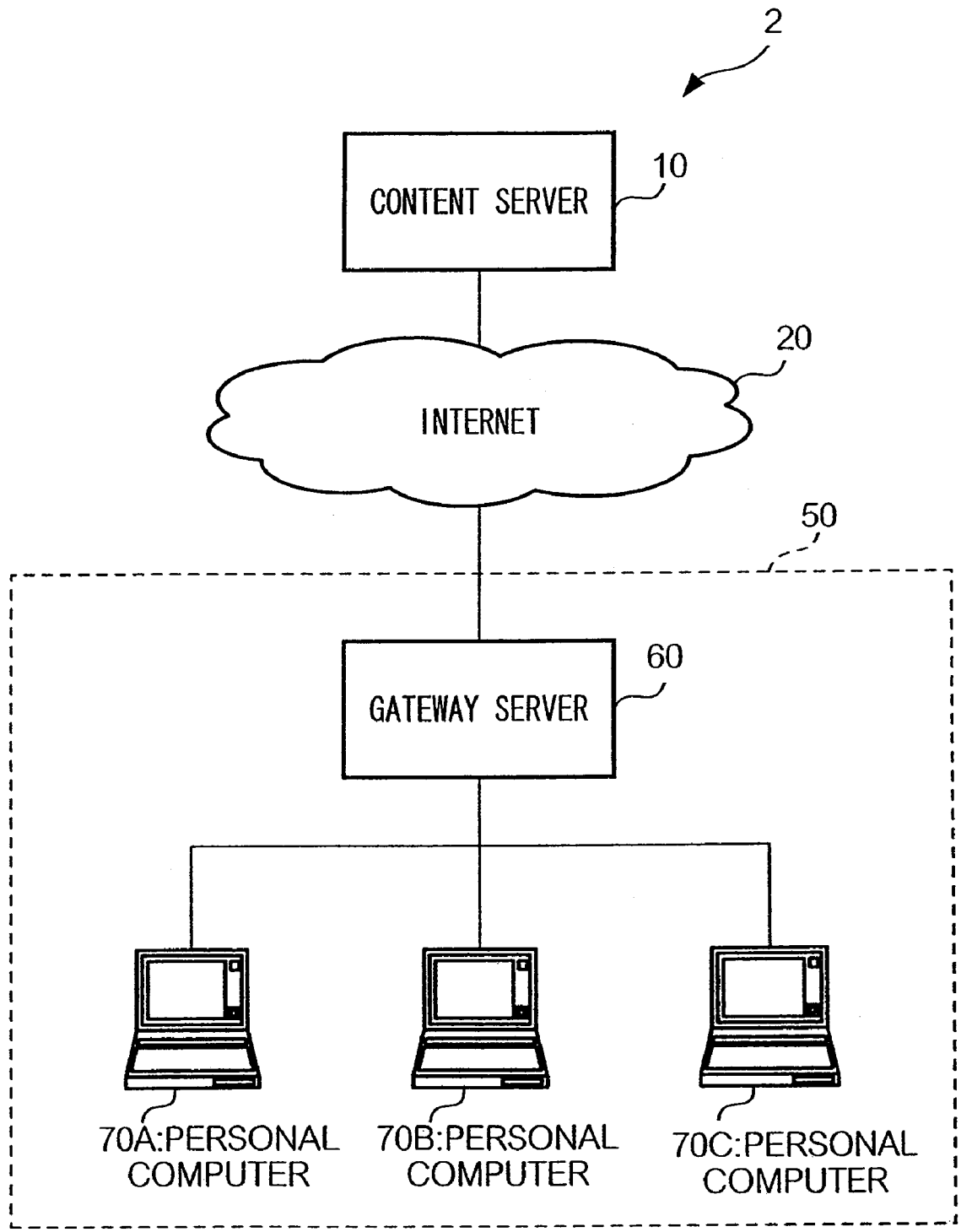
FIG. 12 is a diagram exemplifying the modification 6 of a communication system according to the modifications of the present invention.

Further, as is obvious from modifications of a Java execution environment as described above, the present invention may be applied to various types of electronic devices having communication functions, such as a PHS (Personal Handy System®), a PDA (Personal Digital Assistant), a car navigation device or a personal computer. Further, the present invention is not limited to communication devices stored in mobile packet communication network 30. For example, the present invention may be applied to a personal computer 70A, 70B, and 70C in communication system 2 shown in FIG. 12.

Further, in the above embodiments, it is described that Java AP written in a Java programming language is used; however, programming language is not restricted to Java.

<Modification 7>

Further, in the above embodiments, a perfect encapsulated object with regard to telephone book data is exemplified; however, method and data, both of which belong to a perfect encapsulated object are not restricted to telephone book data. A method may be used for displaying image or motion data such as static image, 3D image, motion picture, and Macromedia Flash®. Further, a method may be used for playing voice or music data in a playing unit of mobile phone 40.

<Effect of the Invention>

As described above, the present invention makes it possible to ensure security for received programs in a communication device, and to enrich functions to be used by the received programs in a communication device as compared with the prior arts.

The invention claimed is:

1. An information processing device comprising:
   a storage device configured to store an application program and data;
   a generator configured to generate an object having a method which is executed in accordance with a code included in the application program, the method showing a procedure of a process using at least a part of data stored in the storage device;
   an access controller configured to prohibit execution of the process using the at least part of data stored in the storage device without executing the method included in the object generated by the generator
   wherein, if a predetermined condition is satisfied, the generator is configured to generate an object having no method to enable data to be used in the process executed in accordance with the code included in the application program.

2. The information processing device according to claim 1, wherein
   the generator is configured to determine whether the predetermined condition is satisfied on the basis of an attribute of data used in a process executed by a method included in an object to be generated.

3. The information processing device according to claim 1, wherein
   the storage device is configured to store a perfect encapsulated class library which is a group of classes, each of the classes describing a structure of the object generated by the generator, none of the classes including a method to enable data to be used in the process executed in accordance with a code included in the application program, the data being used in a process in accordance with a method included in the object generated in accordance with the class,
   if the predetermined condition is satisfied, the generator is configured to generate the object in accordance with a class included in the perfect encapsulated class library.

4. The information processing device according to claim 3, wherein
   the storage device is configured to store an imperfect encapsulated class library which is a group of classes, each of the classes describing a structure of the object generated by the generator and including a method to enable data to be used in the process executed in accordance with a code included in the application program, the data being used in a process in accordance with a method included in the object generated in accordance with the class,
   if the predetermined condition is not satisfied, the generator is configured to generate the object in accordance with a class included in the imperfect encapsulated class library.

5. The information processing device according to claim 1, wherein
   the storage device is configured to store an attribute information showing an attribute of the data,
   the generator is configured to determine whether the predetermined condition is satisfied on the basis of the attribute shown by the attribute information,
   the information processing device further comprises an updater configured to update the attribute information in response to an instruction by a user.

6. The information processing device according to claim 1, further comprising
   a determining unit configured to determine whether an attribute of the application program satisfies a predetermined condition,
   if the determining unit determines that the attribute of the application program satisfies the predetermined condition, the access controller is adapted not to prohibit execution of the process using the at least part of data in accordance with the application program,
   the generator is configured to generate an object having at least one method to enable data to be used in the process executed in accordance with the code included in the application program, regardless of satisfaction of the predetermined condition.

7. The information processing device according to claim 6, further comprising
   an obtaining unit configured to obtain an application, wherein
   the determining unit is configured to determine whether an attribute of the application program satisfies the predetermined condition based on whether the application is obtained by the obtaining unit.

8. The information processing device according to claim 1, further comprising:
   a data controller configured to prohibit data to be read, the data being stored in a storage area other than a predetermined storage area allocated to the application program.

9. The information processing device according to claim 1, wherein
   the application program is described in intermediate codes which cannot be executed without converting the intermediate codes into execution codes which can be executed, and
   the information processing device further comprises a converter configured to convert an intermediate code into an execution code.

10. The information processing device according to claim 1, further comprising
    a generation controller configured to inhibit the generation of an object by the generator if data used in a process in accordance with a method included in the object generated by the generator satisfies a predetermined condition, the inhibited object having a method to enable data to be used in the process executed in accordance with the code included in the application program.

11. The information processing device according to claim 10, wherein the storage device is configured to store attribute information showing an attribute of the data stored in the storage device;

the generation controller is configured to determine whether the attribute of the data satisfies the predetermined condition, the information processing device further comprises an updater configured to update the attribute information in response to an instruction input by a user.

12. The information processing device according to claim 10, wherein the generator is configured to generate an object having no method to enable data to be used in a process executed in accordance with a code which calls a method included in an object other than the object to be generated, if the generation controller inhibits generation of a method by the generator.

13. The information processing device according to claim 10, further comprising a determining unit configured to determine whether an attribute of the application program satisfies a predetermined condition, wherein if the determining unit determines that the attribute of the application program satisfies the predetermined condition, the access controller is adapted not to prohibit execution of the process using the at least part of data in accordance with the application program, the generation controller is adapted not to inhibit generation of the object by the generator with regard to a process executed in accordance with the application program satisfying the predetermined condition.

14. The information processing device according to claim 13, further comprising an obtaining unit configured to obtain an application program, wherein the predetermined condition used in the determining unit is that the application program is obtained by the obtaining unit.

15. A non-transitory computer-readable storage medium storing a program causing a computer device to execute a process, the computer including a storage device configured to store an application program and data, the process comprising:

determining whether a predetermined condition is satisfied;

generating, if it is determined that a predetermined condition is satisfied, an object having a method which is executed in accordance with a code included in an application program, the method showing a procedure of a process using at least a part of data stored in the storage device, the generated object having no method to enable data to be used in the process executed in accordance with the code included in the application program;

prohibiting execution of the process using the at least part of data stored in the storage device without executing the method included in the object generated by the generator.

* * * * *